United States Patent [19]

Fredrickson

[11] E Re. 28,748

[45] Reissued Mar. 30, 1976

[54] BALER

[75] Inventor: Wallace F. Fredrickson, Minneapolis, Minn.

[73] Assignee: Muncher Corporation, St. Cloud, Minn.

[22] Filed: Sept. 23, 1974

[21] Appl. No.: 508,179

Related U.S. Patent Documents

Reissue of:

[64] Patent No.: 3,728,959
Issued: Apr. 24, 1973
Appl. No.: 84,371
Filed: Oct. 27, 1970

[52] U.S. Cl. ..... 100/218; 100/3; 100/100; 100/245; 100/255; 100/272; 100/286; 292/254; 292/DIG. 18

[51] Int. Cl.[2] ..... B30B 15/32

[58] Field of Search ..... 100/218, 240, 245, 270, 100/271, 272, 255, 286, 294; 292/254, 25, DIG. 18

[56] References Cited

UNITED STATES PATENTS

| | | | |
|---|---|---|---|
| 1,040,396 | 10/1912 | Paal | 100/218 |
| 1,126,073 | 1/1915 | Peterson et al. | 100/218 X |
| 1,856,531 | 5/1932 | Berg | 100/255 X |
| 2,243,205 | 5/1941 | Hall | 100/272 X |
| 3,195,447 | 7/1965 | Taylor | 100/218 X |
| 3,280,727 | 10/1966 | Jonas | 100/245 X |
| 3,469,530 | 9/1969 | Walker | 100/218 X |
| R9,897 | 10/1881 | Riesel | 100/218 |

*Primary Examiner*—Billy J. Wilhite
*Attorney, Agent, or Firm*—James R. Haller; H. Dale Palmatier

[57] ABSTRACT

A baler having an improved hydraulically driven toggle mechanism for operating a baler pressing platen, improved bale ejector, and improved baler door latch. The toggle mechanism includes opposed pairs of first and second arms *foldably joined together at their ends with their other respective ends joined to a pressing box and a pressing platen. The opposed sets of arms are mutually oriented so that as the platen is moved to a withdrawn position, the first and second arms of one set interfold compactly and without interference across the respective first and second arms of the opposed set* [ and second arms, each first arm of which is a generally C-shaped bell crank arm. The first arms are connected ] to provide a pressing mechanism which is compact but nonetheless has a long pressing stroke to facilitate production of a large bale in only a few pressing strokes. The bale ejector comprises a lifting plate having a hook which when engaged by a finger secured to the platen lifts the underside of a bale from the rear of the box as the platen is raised to cant the bale onto its forward edge permitting its easy removal from the baler. The lifting plate hook travels in a slot in the baler rear wall and is disengaged from the platen finger by a stop across the slot to drop the lifting plate to the bottom of the box in position for commencement of pressing of a new bale. And, the door latch comprises a rotatable pin and pivotal catch having arced and arcuate surfaces respectively which roll against each other during opening of the door latch to provide an easy opening door latch even when under heavy pressure from a compressed bale.

23 Claims, 5 Drawing Figures

BALER

Matter enclosed in heavy brackets [ ] appears in the original patent but forms no part of this reissue specification; matter printed in italics indicates the additions made by reissue.

BACKGROUND AND FIELD OF THE INVENTION

The present invention relates in general to anti-pollution devices and in particular to refuse balers.

Air pollution has long been a problem. In large cities in particular the problems is especially acute. It is recognized that many deaths of the elderly and of those afflicted with respiratory diseases are attributable to air pollution. It has been noted that the death incidence of such people is markedly higher during high-pollution periods.

One source of air pollution is discharge from incinerators in which refuse, particularly paper and cardboard, is burned. Enormous quantities of shipping containers, alone, are disposed of daily by businesses of all types. Many food stores, for example, have long disposed of the cardboard boxes in which their canned and dry goods are delivered by burning them in incinerators.

Incineration as a form of disposal is objectionable on the further ground that it precludes recycling the material incinerated and is thus wasteful of natural resources. In the case of paper products disposed of by burning, new timber must be cut to product papers that could otherwise have come from the burned paper. An exploding population whose consumption per capita of combustible materials continues to rise, places an ever increasing demand on our natural resources.

An alternative to incineration which is nonpolluting and which permits recycling is baling. Devices which compact refuse such as paper and cardboard into a bale and secure the bale with some form of tie such as wire have long been known.

According to my invention I provide a baler which makes it economically practical to dispose of refuse by baling. I provide a baler which is inexpensive to construct and operate. It can be lightweight and small enough to be easily portable while nonetheless providing a large pressing force throughout a long pressing stroke to produce large, compact bales. My baler, besides being easy to operate, incorporates other labor and operating cost saving features including a specially designed, long-wearing door latch which operates with a minimum of friction to have a long life and require a minimum of maintenance. Another labor saving feature is a bale ejection mechanism which facilitates easy and quick removal of a completed bale.

BRIEF DESCRIPTION OF INVENTION

A baler having an improved hydraulically driven toggle mechanism for operating a baler pressing platen, improved bale ejector, and improved baler door latch. The toggle mechanism includes opposed pairs of first and second arms, each first arm of which is a generally C-shaped bell crank arm. The first arms are connected to provide a pressing mechanism which is compact but nonetheless has a long pressing stroke to facilitate production of a large bale in only a few pressing strokes. The bale ejector comprises a lifting plate having a hook which when engaged by a finger secured to the platen lifts the underside of a bale from the rear of the box as the platen is raised to cant the bale onto its formed edge permitting its easy removal from the baler. The lifting plate hook travels in a slot in the baler rear wall and is disengaged from the platen finger by a stop across the slot to drop the lifting plate to the bottom of the box in position for commencement of pressing of a new bale. Also, a part of my invention is a baler door latch which includes a rotatably mounted pin and a pivotally mounted catch for engaging the pin. The catch includes a concave arcuate surface which partially encircles and contacts an arced surface of the pin to latch the pin and catch. The pin also includes a projection which contacts the catch as the pin is rotated during opening of the door. As the pin is rotated, the pin arced surface rolls on the catch arcuate surface free or nearly free of sliding friction and the projection contacts the catch to pivot the catch out of engagement with the pin and unlatch the door.

BRIEF DESCRIPTION OF FIGURES

Having thus briefly described my invention, I will now describe how to make and use a preferred embodiment of the invention with reference to the accompanying drawings, wherein.

DETAILED DESCRIPTION

Figures 1, 2, 2A, 3, 4:
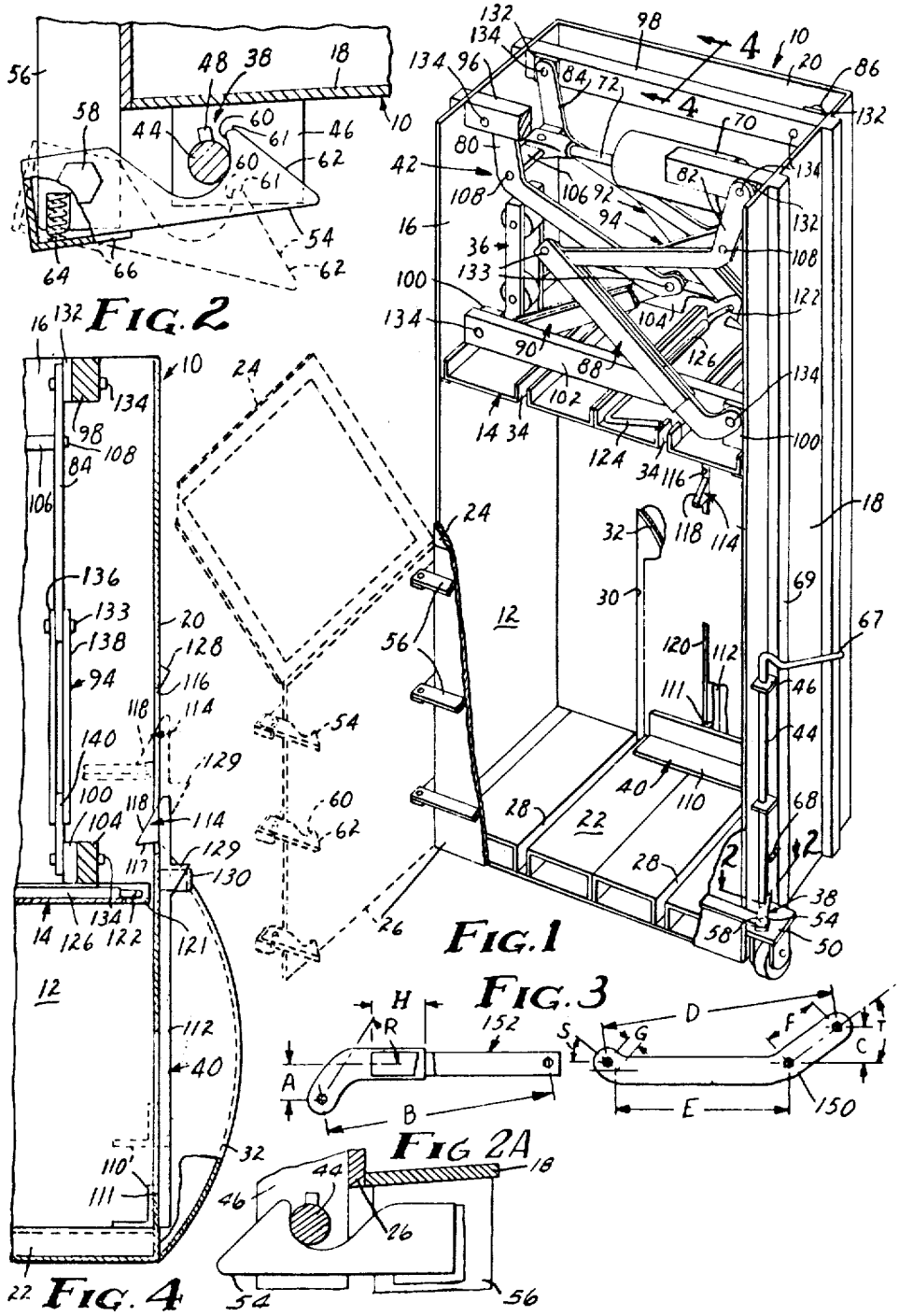
FIG. 1 is a front perspective view of a baler according to my invention.
FIG. 2 is a sectional view taken along line 2—2 of FIG. 1 illustrating the baler door latch.
FIG. 2A illustrates a door latch according to FIG. 2 but with the positions of the latch pin and catch reversed.
FIG. 3 is a front plan view of a first and of a second arm of the baler pressing mechanism shown in FIG. 1.
FIG. 4 is a sectional view taken along line 4—4 of FIG. 1 illustrating the baler bale ejection mechanism and interconnection of the various components of the baler pressing mechanism.

Referring now to FIG. 1, a baler according to my invention is shown as 10. The baler is shown to comprise a pressing box 12 in which a pressing platen 14 is disposed for reciprocable movement along the vertical axis of the box. The box 12 has a pair of side walls 16 and 18, a rear wall 20, a bottom 22 and a charging door 24 and lower door 26. The box 12 tapers from front to back by having the rear wall 20 narrower than doors 24 and 26. The bottom 22 is provided with a pair of grooves 28 and rear wall 20 includes a pair of corresponding slots 30, one of which is hidden from view by side wall 18. Rear wall 20 is partially cut away to show a curved guideway 32 which runs from the bottom to the top of the lefthand slot 30; there is a similar guideway for the righthand slot. The grooves 28, slots 30, guideways 32, and grooves 34 (in the underside of platen 14) cooperate to facilitate securing ties around a completed bale held in a compressed state by platen 14. Platen 14 is provided on each side with a vertical combination of rollers, the lefthand combination of which is shown as 36. A similar combination of rollers is mounted in a like fashion to the righthand side of the platen but is hidden from view by side wall 18. Either the diameter of each of the rollers varies across the roller width at a rate corresponding to the taper of the wall against which it rolls, or the axis of rotation of the rollers are set parallel to the wall against which they roll. The features described thus far are not considered a part of the present invention.

What is considered to be my present invention, still referring to FIG. 1, are the door latch, bale ejection mechanism, and bale pressing mechanism shown generally as 38, 40, and 42, respectively. Three door latches are shown, they comprising a single elongate rotatably mounted pin 44 common to all three latches and three identical pivotably mounted catches 54. Throughout this detailed description it is to be understood that where specific dimensions, angles, shapes, or the like are recited, they are not given by way of limitation but instead are given to facilitate making and using a preferred embodiment of my invention and to illustrate the principles underlying my invention in general. For example, pin 44 in the preferred embodiment shown in FIG. 1 is a ⅝ inch diameter steel rod. However, it will be readily appreciated by one of ordinary skill in the art upon a reading of the following description of the door latch that pin 44 need not have a circular cross-section, but rather, need only have an arced surface in its circumference for rolling engagement with the catch.

Pin 44 is mounted for rotation to side wall 18 by mounting sockets, one of which sockets is designed 46. Pin 44 rests on a pad 50 which is welded to side wall 18. Also included in each door latch is a catch 54. Each catch is pivotably mounted by pivot 58 to a bracket 56 which in turn is secured to door 26. Bracket 56 is drilled and tapped for insertion of pivot 58 which is a ⅝ inch machine bolt; the bolt is screwed into the bracket and locked with a lock washer and nut. The center of the hole in bracket 56 for pivot 58 is about 1 inch outside the center of pin 44.

Further details of a door latch are evident from FIG. 2 wherein an engaged catch and pin as viewed along line 2—2 of FIG. 1 is shown. A view of the catch pivoted to a disengaged position is shown in dashed lines. Pin 44 is shown to be also provided with a projection 48 and to be connected to one end of a spring 68 which is connected at its other end to wall 18. Spring 68 acts as a pin positioning means in cooperation with the pin handle 67 and the side wall reinforcement tube 69. Spring 68 biases pin 44 in a "latching" position, and, although the spring alone could position the pin in latching position, the bend of handle 67 is made to even more precisely position the pin projection 48 just out of contact with the catch 54 when the pin and catch are engaged.

Turning now to consideration of catch 54, it is seen in FIG. 2 to have an indentation in its side which faces toward pin 44. The catch 54 is fabricated from a blank which is a 5¼ inch long piece of ½ inch mild-steel plate. The catch indentation includes a concave arcuate surface 60 which faces toward the catch pivot to partially encircle and contact the arced surface of pin 44. Surface 60 has the radius of a ¾ inch diameter hole; this hole and the ⅜ inch diameter pivot hole are spaced about 2½ inches center to center. The center of the concave surface radius and the ⅜ inch hole center are 3/16 and ¾ inch from the side of the blank towards the pin. The foregoing dimensions and relationships insure positive engagement of the pin and catch. To further protect against the catch sliding off and disengaging from the pin, the catch pivot point is placed about one inch outside the pin center so that the catch angles back towards the pin. During opening of the latch, as pin 44 is rotated in a clockwise direction, the arced circumference of the pin rolls on the catch arcuate surface free or nearly free of sliding friction as the projection strikes against the catch strike surface 61 to pivot the catch out of engagement with the pin and unlatch the door. Also included in the catch is a spring 64 which biases the catch towards a closed position. The spring 64 is held in a hole drilled about ¾ inch deep into bracket 56 by an L-shaped strip 66 secured to catch 54. In FIG. 2, catch 54 and bracket 56 are partially cut away to show the spring. Strip 66 in cooperation with a side and an end edge of bracket 56 limits pivoting of catch 54 to between, respectively, one position away from the pin slightly more than necessary to disengage the catch and pin and another position towards the pin slightly past the position at which the pin and catch are engaged. These positions are not critical, but are only selected to provide a freely operating door latch while avoiding excessive catch movement. With the door latch closed, spring 64 is under slight compression. As the catch is pivoted during opening or closing, spring 64 becomes progressively more compressed to provide a force for returning the catch to a closed position when the door reaches either an open or a closed position. Catch 54 is also provided with a beveled end formed by surface 62 which is a continuation of the arcuate surface and which angles away from both the side of the catch including the indentation and the catch pivot. During latching, the beveled end slidably contacts the pin to pivot the catch from the closed position towards the open position until the beveled end slides by and the indentation reaches the pin whereupon the spring 64 returns the catch to a closed position. In view 2A of FIG. 2 the pin 44 and catch 54 are shown in their alternate position; namely, with pin 44 mounted by mounting socket 46 to door 26 and catch 54 mounted by bracket 56 to side wall 18.

Returning now to FIG. 1, the baler pressing mechanism 42 shall now be described. The force producing means of the pressing mechanism comprises a hydraulic system which includes a hydraulic cylinder 70 and piston 72 which telescope in a conventional manner to produce a force in a direction always normal to the box vertical axis and along the two opposite directions of the piston travel. For the preferred embodiment shown, a 4 inch diameter cylinder with a 10 inch stroke which produces a force of 25,000 pounds is employed.

The remainder of the hydraulic system includes pumps, hoses connecting the pumps to the cylinder, and switches for controlling the fluid flow between the pumps and cylinder. These latter components of the system are mounted on the exterior of the box and may be constructed of commercially available, standard components in a well known manner. These components and their connection are incidental to the present invention.

A force translation means which converts at least a portion of a force produced by the hydraulic system to a re-directed force in a direction along the box vertical axis includes front and rear sets of opposed arms comprising a front pair of opposed first arms, 80 and 82, a rear pair of opposed first arms, 84 and 86, a front pair of opposed second arms, 88 and 90, and a rear pair of second arms, 92 and 94. These arms 80–94 are all of equal length; their construction shall be described later. The first arms 80–86 are each a bell crank arm *and each is foldably and rotatably secured at its end to an end of a second arm with opposing first arms being thus*

*secured to different ones of a pair of opposing second arms. The first arms* [and] are each rotatably secured *at their other ends* to one or the other of support members 96 and 98 which in turn are secured to the side walls of the pressing box. Support members 96 and 98 are formed of 2 by 3 inch rectangular box tubing. [The other end of each first arm is rotatably secured to an end of a second arm with opposing first arms being connected to different ones of a pair of opposing second arms.] The other end of each second arm is rotatably secured to a leg of the pressing platen. The forward ones of these legs are visible in FIG. 1 and are designated as 100. All the axes about which the first and second arms 80–94 rotate are parallel to each other but normal to the box vertical axis. The legs 100 are secured to the channel irons which form the pressing platen and to front and rear reinforcement members 102 and 104 which span the width of the platen. The hydraulic system force producing means is coupled to the force translation means by a pair of cross-members each of which is pivotally connected between corresponding (front and rear) first arms *adjacent the attachment of their other ends to the box through support members 96, 98.* The piston 72 is shown connected to one of the cross-members, designated 106. midway between the cross-member ends. The force translation means provides a large mechanical advantage to in turn permit use of a low pressure and thus inexpensive hydraulic system. The force translation means also permits of a wide and deep pressing box in addition to providing a long pressing stroke even through it also provides a highly compact pressing mechanism when the pressing platen is fully withdrawn. *As shown in FIG. 1 and as will be evident from the exemplary dimensions given below, the arms 80–94 are of sufficient length and are mutually oriented so that when the platen is moved to its withdrawn position, the arms interfold to cross one another without interference, the first arms 80, 84 at one side of the box crossing and being received between the opposed first arms 82, 86 and the second arms 90, 94 at one side of the box crossing and being received between the opposed second arms 88, 92. In this collapsed, interfolded position, the arms take up little vertical space and are received in a relatively small area at the upper end of the pressing box.* The result is a large charging area which produces further economies as a large quantity of refuse can be loaded into the pressing box to produce a large bale in only a few pressing strokes. The compactness of the pressing mechanism is due in part to the bends in the first and second arms, particularly those of the first arms. Although the bend in each second arm may also contribute to a compact pressing mechanism, for reasons which will be explained later, for the embodiment shown, it is possible to achieve the same compactness with straight second arms. In FIG. 1, the end of arm 90 is partially cut away to illustrate that the end of arm 80 connected to the second arm is bent, as are all similar first arm ends; the cut away view makes it apparent that the first arms are folded between side pieces of the second arms as the arms approach a position parallel to the box vertical axis. For the embodiment shown, the degree of parallelity achieved is dependent upon the construction of the first arm in a manner to be described in greater detail hereinafter.

The shapes of a first and a second arm of the illustrated preferred embodiment of FIG. 1 are more clearly shown in FIG. 3 wherein a first and a second arm are shown drawn to scale. *With reference to FIGS. 1 and 3,* [A] *a* first arm 150 is shown to have a first straight segment thereof, designated as dimension F [,] (*FIG. 3*). *As shown in FIG. 1, this segment extends* [extending] *generally downwardly* between the end for connection with a side wall of the baler and the point for connection with a cross-member, *the arm thence extending obliquely inwardly of the box for attachment to the second arm and crossing the opposed first arm when the arms are in their folded position.* The other end segment is also straight and is dimensioned as G. Both segments F and G form angles, 25 and 15 degrees respectively, with the middle segment, which middle segment is likewise straight and is dimensioned E in FIG. 3. The end segments are approximately one-third and one-twelfth the length of the middle segment. The shorter segment and the bend angles are chosen to minimize the pressing mechanism heighth yet provide a lever arm, C, which will start the platen moving downward readily with the platen in a fully withdrawn position. The second arm 152 comprises only two segments which form a bend of about 58 degrees. The length of the shorter segment and the bend angle are chosen relative to the platen leg 100 heighth so that dimension B is as long as possible while dimension A approaches the heighth of platen leg 100. The first arm 150 is thus seen to have a generally C-shape and the second arm a generally L-shape. As shown in FIG. 1, the C-shapes face each other and conversely the L-shapes face away from each other when the platen is in an extended position. Each of the bends serves to improve the baler pressing mechanism heighth to stroke ratio. In the preferred embodiment of FIG. 1, for a box width of 36 inches, by utilizing curved arms having dimension as given below, a platen stroke of 40 inches for a linkage mechanism heighth of only 12 inches is provided. By contrast, the stroke and heighth for a mechanism with straight arms having lengths equal to dimensions B and D would be 30 and 22 inches respectively.

| arm 150 | | arm 152 | |
|---|---|---|---|
| C | 2¾ in. | A | 4¾ in. |
| D | 24⅜" | B | 24⅜ in. |
| E | 18 in. | H | 6 in. |
| F | 6⅛" | R | 58° |
| G | 1½ in. | | |
| S | 15° | | |
| T | 25° | | |

Because the first arms fold between the side pieces of the second arms, Dimension H should be as small as possible; the shorter this dimension, the closer the second arm approaches to normal to the box vertical axis when the platen is fully withdrawn. I have found that this H dimension can be reduced to 4 inches if the second arm 152 is straight instead of bent. However, no overall heighth eduction is realized as the additional amount which the first arm folds into the second arm is offset since the reinforcement members 102 and 104 are not brought above any part of the second arm. Nonetheless, some advantages are realized as when straight arms are used it is not longer necessary to cut away any of the vertical edges of the channel irons of platen 14.

The construction and interconnection of a first and second arm and their connection with the pressing box 12, platen 14, and cross-member 106 are shown in FIG. 4, a sectional view taken through the middle of rear .ll 20 looking along line 4—4 of FIG. 1. As shown, : first arm 84 is of single piece construction and is nnected to spacer pad 132 and support member 98 a pin 134. First arm 84 is also connected to cross :mber 106 by a pin 108. Second arm 94 is of multi-:ce construction, consisting of a pair of identical side :ces 136 and 138 which sandwich an end of the first n 84 and a connecting member 140. A pin 133 con-cts first arm 84 and second arm 94, while the second n is connected by its connecting member 140 with a ı 134 to leg 100 and reinforcement member 104. though they have been omitted for the sake of clar-, it will be appreciated that each bearing surface of ıs 108, 133, and 134 is supplied with a lubricant :ough grease fittings. An anti-seize and lubricating mpound such as that sold under the Trade Name of :ver-Seez by the Never-Seez Corporation of Broad-:w Illinois has been found to be an acceptable lubri-nt.

Returning again to FIG. 1, the bale ejection mecha-ism 40 shall now be described. It is shown to include ifting plate 110 which normally rests flat on the bot-m of the baler next to the rear wall. The depth of the ate 110 is important and should be about ⅙th the box pth. It has been found that when this dimension is creased to about 1/6th the box depth the plate tends lift the entire bale instead of canting the bale onto its rward edge. Lifting plate 110 is secured by a spacer .1 to a bar 112. Spacer 111 is slightly thicker than the ickness of rear wall 20 to permit free vertical move-ent of plate 110 as well as a slight pivoting of bar 112 a manner as will be explained later. The upper end of ır 112 terminates in a hook 114 which extends rough a slot 116 in the baler rear wall and has a lower rface 117 and an upper surface 118 each of which ɔpe from the rear wall towards the bottom of the box. he bar 112 is similarly sloped for about one-half on its idth. A slot 120 in rear wall 20 permits vertical move-ent of plate 110. The remainder of the ejection mech-ıism includes a finger 122 secured to platen 14 and ovable by a handle 124 into position for engagement / hook 114. Finger 122 and handle 124 are mounted ı platen 14 by pipe 126 and are off-angle so that there 'e as a practical matter only two stable positions for ıe finger, one being an upright "neutral" position as ıown in FIG. 1 wih the handle resting on the upright ange of the platen and the other being an "engage-ıent" position with finger 122 lying horizontally on the laten. A stop 128 having the same slope as surface 118 affixed across slot 116 at the point at which the hook nd finger are to be disengaged.

The manner in which the bale ejection mechanism perates and further details of its construction shall ow be described with reference to FIG. 4. It will be ppreciated that during compensation of a bale, finger 22 is in the neutral position to permit platen 14 to escend below hook 114 by virtue of a cut-out in the laten which is wide enough to permit passage by hook 14 but narrow enough that finger 122 bridges the ut-out when in the engagement position. The far sur-ace of the cut-out is shown in FIG. 4 as 121. With .nger 122 in position for engagement, hook 114 is ngaged by the finger as platen 14 is raised to in turn ft plate 110. Lifting of plate 110 continues until sur-ace 118 slidably contacts stop 128 whereupon hook 14 is forced out of the slot to disengage the hook from he finger and drop the lifting plate to the bottom of the ıaler. As plate 110 drops, a wedge shaped projection 129 on bar 112 slides against a U-shaped strap 130 to force hook 114 into the box. During the next downward stroke of platen 14, finger 122 is still in the engagement position. As platen 14 moves downward past hook 114, finger 122 upon striking the upper surface 118 of the hook is rotated towards its neutral position. Because of the angle between handle 124 and finger 122, a finger 122 is rotated towards its neutral position, the center of gravity of the finger, handle and their connecting piece passes to the right of center whereupon the handle flips over against the platen to return the finger to its neutral position.

As is apparent in FIG. 4, the under surface 117 of hook 114 which contacts finger 122 slopes gradually from the rear wall downwards towards the bottom of the box. It has been found that without this slope, the hook tends to disengage prematurely. A slope for surface 117 of about 8° has been found acceptable when used with a surface 118 having a slope of about 60°. If this latter angle becomes appreciably less than 60°, such as about 50°, I have found that there is excessive friction between the stop 128 and hook surface 118. Returning to the description of lifting plate 110, it is shown to be joined by a spacer 111 to bar 112. For the embodiment shown, side and rear walls 16, 18 and 20 are 3/16 inch sheet steel. Spacer 111 is ¼ inch thick; this thickness has been found sufficiently wide to permit pivoting of bar 112 as hook 114 is forced out of slot 116.

In a version of the foregoing described preferred embodiment used for compressing corrugated cardboard, the following was found suitable for producing bales weighing in excess of 150 pounds:

| | |
|---|---|
| side walls 16 & 18 | 3/16 inch sheet steel, 80 inches high by 24 inches deep; |
| rear wall 20 | 3/16 inch sheet steel, 80 inches high by 36 inches wide; |
| pin 44 | ⅝ inch dia. hot rolled steel rod |
| mounting socket 46 | ½ by 1½ inch bar stock with a ⅝ inch dia. hole for accepting pin 44; |
| projection 48 | 2½ inch long piece of ¼ by ⅝ inch cold rolled bar stock; |
| bracket 56 | ½ by 1½ inch bar stock; 0.055 in. dia. spring wire would into 12 coils 1¼ in. long with an O.D. of 0.295 in.; |
| strip 66 | 1 inch length of 1½ by 1½ by ⅛ in. angle iron; |
| hydraulics (70 & 72) | an Energy Manufacturing Inc. CTR series 4 in. dia. and 10 in. stroke, Monticello, Iowa; |
| first arms 80–86 | 1 in. plate steel; |
| supports 96 & 98 | 7 gauge, 2 by 3 in. box tubing; |
| leg 100 | 5 in. piece of ½ by 2½ in. bar stock; |
| members 102 & 104 | 7 gauge, 1½ by 3 in. box tubing; |
| cross-member 106 | 1⅛ by 3 in. bar stock; |
| pin 108 | 5 in. length of 1½ in. dia. cold rolled rod; |
| plate 110 | 13 in. piece of 3 by 3 by 3/16 in. angle iron; |
| bar 112 | 34 in. piece of ¾ by ¾ bar stock; |
| hook 114 | cut from ½ by 2 in. bar stock; |
| slot 116 | ¾ in. wide by 11 in. long; |
| slot 120 | one in. wide by 15 in. long; |
| finger 122 | ⅝ in. dia. hot rolled steel rod; |
| stop 128 and wedge 129 | 1 by 2 by ¼ in. angle iron; |
| strap 130 | ¼ by 1¼ bar stock |

-continued

| | |
|---|---|
| spacer 132 | 3 in. piece of ½ by 2½ in. bar stock |
| pin 133 | 1 in. dia. cold rolled steel rod; |
| pin 134 | 1¼ in. dia. stress proof pin; |
| side pieces 136 & 138 | ½ by 2½ in. bar stock |
| connector 140 | 1 by 3 in. bar stock |

Having thus described a preferred embodiment of my invention, it will be readily apparent that numerous variations and modifications thereof are possible. For example, the hydraulic cylinder and piston are shown connected to the first arms to form a second class lever; connections which form first and third class levers are of course possible. Likewise, it would be possible to connect the force producing means between the second arms to form first, second, or third class levers.

Although my invention has been shown as having four first and four second arms connected as two sets of arms on each side of the box, a single set of arms on each side, preferably centered between the front and back of the platen, would suffice. Similarly within my invention is a baler having two additional sets of arms on each side of the piston and cylinder connected in tandem with the existing arms to cross-members connected to extensions of the piston and cylinder and to extensions of support members 96 and 98; such an arrangement would facilitate construction of a wider baler.

While the invention has been described with reference to a preferred embodiment, it is to be understood that the above modifications and variations and others not specifically mentioned are within the spirit and scope of the invention.

What is claimed is:

1. A baler comprising a pressing box having a rear wall, a pair of side walls, a door hinged to a side wall; a platen mounted for reciprocable movement within the pressing box; and a door latch which includes a rotatably mounted pin and a pivotally mounted catch for engaging the pin, either the pin or the catch being mounted to the baler door and the other being mounted to a side wall of the baler, the side of the catch which faces the pin when the door is closed having an indentation for partially encircling and engaging the pin, the indentation including a concave arcuate surface which faces toward the catch pivot and the pin having an arced surface in its circumference on a radius of the pin axis of rotation, which arced surface faces away from the catch pivot when the catch and pin are in position for engagement, the concave arcuate surface having a radius greater than the arced surface radius and partially encircling and contacting the arced surface when the pin and catch are engaged, and which pin includes a projection for contacting the catch as the pin is rotated in a direction to pivot the catch out of engagement with the pin during opening of the door, as the catch pivots the pin arced surface rolls on the catch arcuate surface to pivot the catch and unlatch the door.

2. A baler according to claim 1 wherein the pin is of circular cross section and wherein the arcuate surface has a length greater than the pin radius to accept more than one-half of the pin in the indentation when the pin and catch are engaged.

3. A baler according to claim 2 wherein the catch further comprises means for limiting pivoting of the catch to between an open position away from the pin slightly further than necessary to disengage the pin and catch and a closed position towards the pin and just past the position at which the pin and catch are engaged.

4. A baler according to claim 3 wherein the catch further comprises catch positioning means which biases the catch towards the closed position.

5. A baler according to claim 4 wherein the catch has a beveled end formed by a surface which is a continuation of the arcuate surface and which angles away from both the side of the catch including the indentation and the catch pivot, which beveled end slidably contacts the pin as the door is being closed to pivot the catch from the closed position towards the open position until the beveled end slides by and the indentation reaches the pin whereupon the catch positioning means returns the catch to a closed position with the arcuate surface partially encircling and contacting the pin.

6. A baler according to claim 5 wherein the pin further comprises pin positioning means which biases the pin in a latching position at which the projection will contact the catch upon slight rotation of the pin in a direction to disengage the pin and catch.

7. A baler according to claim 6 wherein the pin positioning means comprises a spring coupled to the baler and to the pin to exert a torsional force against the pin as the pin is rotated from the latching position.

8. A baler according to claim 7 wherein the catch positioning means comprises a coil spring held between the baler and the catch, the spring acting against the catch during opening and closing of the door latch and the spring returning the catch to a closed position when the door is in either an open or a closed position.

9. A baler according to claim 7 wherein the spring is in relatively low compression when the catch is in the closed position but which becomes increasingly more compressed as the catch pivots during opening and closing of the door.

10. A baler having a pressing box having a bottom, a rear wall, a pair of side walls, a platen, a door hinged to one side wall, and a door latch for latching the door to the other side wall and a bale ejection mechanism which comprises:

in the rear wall, a first slot in and extending upwardly from the bottom of the wall and a second slot in vertical alignment with the first slot and extending upwardly from slightly above the top of a completed bale;

bale lifting means including an angle iron having one side which normally lies flat against the baler bottom and which is of a dimension sufficient to provide canting of a bale upon raising the lifting means and the other side of which angle iron normally abuts the baler rear wall; and releasable bale lifting engagement means including a hook which normally is at the bottom of and extends through the second slot, which hook has an upper surface and an under surface which both slope from the rear wall toward the bottom of the box, the upper surface sloping steeply at an angle of about 60° and the under surface sloping gradually at an angle of about 8°, a bar connected to the hook and extending downwardly to the bottom of the baler in alignment with the first slot, a spacer of a thickness slightly greater than the rear wall disposed in the first slot and connecting the bar and the angle iron, a finger on the platen moveable into position for engagement by the hook when the platen is holding a completed bale in a compressed state, and a stop across the second slot at a heighth at which the hook is to be disengaged from the finger.

11. A baler comprising a pressing box having a rear wall, a pair of side walls, a bottom, and a door hinged to one of the side walls;

a door latch including a rotatably mounted pin and a pivotably mounted catch for engaging the pin, either the pin or the catch being mounted to the baler door and the other being mounted to a side wall of the baler, the side of the catch which faces the pin when the door is closed having an indentation for partially encircling and engaging the pin, the indentation including a concave arcuate surface which faces toward the catch pivot and the pin having an arced surface in its circumference on a radius of the pin axis of rotation, which arced surface faces away from the catch pivot when the catch and pin are in position for engagement, the concave arcuate surface having a radius greater than the arced surface radius and partially encircling and contacting the arced surface when the pin and catch are engaged, and which pin includes a projection for contacting the catch as the pin is rotated in a direction to pivot the catch out of engagement with the pin during opening of the door, as the catch pivots the pin arced surface rolls on the catch arcuate surface to pivot the catch and unlatch the door;

a pressing platen for reciprocable movement parallel to the box walls between a withdrawn position near the top of the box and an extended position toward the bottom of the box;

a pressing mechanism comprising front and rear sets of opposed arms, each set of arms having a pair of facing, C-shaped first arms each of which is rotatably connected at one end to a support member near the top of the box and rotatably connected at an opposite end to an end of a second arm the opposite end of which is rotatably connected to the pressing platen, a first cross-member connected between one pair of front and rear first arms and another cross-member connected between the other pair of front and rear first arms, the cross-member being connected equal distances from the ends of the first arms connected to the support members and a hydraulic cylinder and piston having the piston connected to one cross-member and the cylinder connected to the other cross-member; and a bale ejection mechanism comprising a lifting plate which normally rests flat on the bottom against the rear wall, a spacer connected to the plate and disposed in a first vertical slot in the rear wall, a bar connected to the spacer and extending upwardly to the bottom of a second vertical slot in the rear wall at a height slightly above the top of a completed bale, a hook connected to the bar and extending through the wall and into the baler, the hook having an upper and an under surface both of which slope from the rear wall toward the bottom, the upper surface sloping steeply at an angle of about 60° and the under surface sloping gradually at an angle of about 8°, a finger on the platen and moveable from a neutral position into a position for engagement with the under surface of the hook when the platen is holding a bale in a compressed state, and a stop across the second slot at a heighth at which the finger and hook are to be disengaged.

12. A baler having a [ pressed ] *pressing* box, a pressing platen and a pressing mechanism comprising a toggle mechanism for reciprocally moving the pressing platen between a withdrawn and an extended position and which includes at least a pair of opposing sets of arms, each set including a generally C-shaped first arm and a second arm, each of which C-shaped first arms comprises a straight middle segment between a pair of straight end segments and is rotatably connected at one end to a side wall of, and near the top of, the pressing box to face each other when the platen is is an extended position, which second arms are rotatably connected at one end to the pressing platen, and the other end of which first and second arms are connected to each other, which first arms are equal length and which second arms are equal length, and all axes of rotation of all first and second arms are parallel to each other but normal to the box axis; and a hydraulic system which includes a piston and a cylinder, which piston and cylinder are connected between corresponding ends of a pair of opposing arms whereby expansion and contraction of the hydraulic system rotates the toggle mechanism first and second arms from a position approaching normal to the box axis to a position approaching parallel to the box axis to provide a compact pressing mechanism and a large charging area when the platen is in a withdrawn position, thereby facilitating production of a large bale in only a few pressing strokes.

13. A baler according to claim 12 in which the baler pressing box has a bottom and a rear wall and has a bale ejection mechanism including a lifting plate which normally lies flat on the pressing box bottom next to the rear wall, and an engagement means for releasably engaging the lifting plate with the pressing platen during an upward movement of the platen, which engagement means comprises:

a hook secured to the lifting plate and extending through a vertical slot in the rear wall at a position above a completed bale, the hook having a beveled upper surface which slopes from the rear wall towards the bottom of the box;

a finger secured to the platen and adapted to be moved into position for engagement by the hook as the platen is raised from a completed bale; and a stop across the slot at a position at which the hook is to be disengaged from the finger, the platen when the hook and finger are engaged during an upward stroke of the pressing platen drawing the lifting plate upwardly until the beveled edge of the hook slidably contacts the stop to force the hook out of the box and disengage the hook and finger to drop the lifting plate to the bottom of the box.

14. A baler according to claim 13 having a door hinged to one side of the pressing box which is closed and latched to confine and permit compression of refuse in the baler but which is unlatched and opened to permit removal of a completed bale, further comprising a door latch which includes a rotatably mounted pin and a pivotably mounted catch for engaging the pin, either the pin or the catch being mounted to the baler door and the other being mounted to a side wall of the baler, the side of the catch which faces the pin when the door is closed having an indentation for partially encircling and engaging the pin, the indentation including a concave arcuate surface which faces toward the catch pivot and the pin having an arced surface in its circumference on a radius of the pin axis of rotation, which arced surfaced faces away from the catch pivot when the catch and pin are in position for engagement, the concave arcuate surface having a radius greater than the arced surface radius and partially encircling and contacting the arced surface when the pin and catch are engaged, and which pin includes a projection for contacting the catch as the pin is rotated in a direction to pivot the catch out of engagement with the pin during opening of the door, as the catch pivots the pin arced surface rolls on the catch arcuate surface to pivot the catch and unlatch the door.

15. A baler according to claim 12 wherein each segment of each generally C-shaped first arm is connected to the pressing box at one end and the other of said end segments is connected to a said second arm, and said first and other end segments are joined to the middle segment at angles respectively of 25° and 15° and have lengths respectively one-third and one-twelfth the middle segment length.

16. A baler according to claim 12 wherein:

each second arm is generally L-shaped and is connected to the platen by a leg on the platen, each second arm comprises a pair of straight segments, a first segment of which has a length less than the length of and is connected to the platen leg, and the L-shaped arms face away from each other when the platen is in an extended position.

17. A baler according to claim 16 wherein each said generally L-shaped arm comprises a pair of straight segments joined at an angle of about 60°.

18. A baler according to claim 16 wherein the toggle mechanism comprises two sets of opposing pairs of arms, one set connected towards the rear and the other connected towards the front of the pressing box and wherein the hydraulic system further comprises a cross-member pivotally connected between front and rear arms on one side of the box and another cross-member connected between front and rear first arms on the other side of box; the piston of said hydraulic system being connected to one and the cylinder of said hydraulic system being connected to the other of the cross members.

*19. A baler for baling refuse and the like and having a large charging area into which refuse is received, the baler comprising:*

*a pressing box;*

*a pressing platen movable axially within the box to compress refuse into a bale;*

*a toggle mechanism for moving the platen axially of the box in a long stroke between a withdrawn position permitting refuse to be charged to the pressing box and an extended position for compressing refuse in the box into a bale, the toggle mechanism comprising a pair of opposed sets of arms, each set including first and second arms foldably joined at their ends and having their other ends pivotally attached adjacent a side of the box to the box and to the platen, respectively, the other ends of one set of arms attached adjacent one side of the box and the other ends of the opposed set of arms attached adjacent an opposed side of the box, the first and second arms of each set being foldable inwardly of the box and being of sufficient length and mutually positioned so as to cross the respective first and second arms of the other set without interference as the arms are simultaneously and compactly folded inwardly of the box into a position approaching normal to the box axis; and*

*a hydraulic cylinder and piston connected transversely between opposing arms adjacent their other ends and oriented to provide force in a direction normal to the axis of the pressing box to cause folding and unfolding of the arms between positions approaching normal to the box axis and approaching parallel to the box axis.*

*20. A baler for baling refuse and the like and having a large charging area into which refuse is received, the baler comprising:*

*a. a pressing box having upright front, rear and side walls and a bottom;*

*b. a pressing platen movable parallel of the upright box walls between an upper, withdrawn position and an extended position toward the bottom of the box;*

*c. a pressing mechanism comprising spaced front and rear pairs of opposed, foldable sets of arms, each set including first and second arms foldably joined at their ends and having their other ends pivotally attached adjacent a side wall of the box respectively to the box adjacent its top and to the platen; the other ends of one set of arms attached adjacent one side wall and the other ends of the opposed set attached adjacent the opposed side wall, the first and second arms of each set being foldable inwardly of the box and being of sufficient length and mutually positioned so as to cross the respective first and second arms of the opposed set of arms without interference as the sets of arms are simultaneously and compactly folded inwardly of the box into a position approaching normal to the box axis, the parallel, spaced front and rear sets of arms adjacent one side wall of the box being received between the opposed front and rear sets of arms adjacent the other side wall of the box;*

*d. a pair of confronting cross members respectively joining front and rear first arms at points adjacent but spaced from the pivotal connections of the latter to the box; and*

*e. a hydraulic cylinder and piston mounted between the cross members to force the same away from and toward each other to respectively extend and withdraw the platen.*

*21. A baler for baling refuse and the like and comprising a pressing platen for compressing refuse and a toggle mechanism above the platen for driving the latter up and down; a pressing box having front, rear and side walls and within which the platen moves between an upper, withdrawn position and a lower, refuse-compressing position, the pressing box having a large, lower, refuse charging area and a relatively small, upper area within which the platen and toggle mechanism are received when the platen is in its withdrawn position; the toggle mechanism comprising a pair of opposed, inwardly foldable sets of arms mounted adjacent opposed side walls of the box, each set including first and second arms foldably joined at their ends and having their other ends rotatably joined respectively to the pressing box and platen, the first and second arms of the sets being of sufficient length and positioned with respect to the other arms so as to extend into positions approaching parallel to the vertical box axis when the platen is moved downwardly in a long pressing stroke, and being foldable compactly inwardly*

*ross one another without interference into positions proaching normal to the box axis within the upper area the box as the platen is moved to its upper, withdrawn sition; the baler including a hydraulic cylinder and ·ton mounted between opposing first arms at points aced from but adjacent the rotatable joints between the st arms and the box for extension and retraction in a insverse direction to respectively unfold the arms in a ig pressing stroke and to fold the arms compactly ross each other as the platen assumes its withdrawn sition.*

*22. The baler of claim 21 wherein the first arms of ch set of arms is configured to project generally downrdly from its pivotal connection to the box and then nerally inwardly at an oblique angle when the platen is its withdrawn position, the hydraulic cylinder and iton being attached to the first arms at vertices of the lique angles, whereby the platen easily may be started wnwardly from its withdrawn position by extension of e piston from the hydraulic cylinder.*

*23. A baler for baling refuse and the like and comprisg a pressing box having front, rear, side and bottom alls; a pressing platen movable vertically within the box tween an upper, withdrawn position and a lower, fuse-compressing position; a pressing mechanism above the platen and comprising spaced, front and rear pairs of opposed, inwardly foldable sets of arms, each set including first and second arms foldably joined together at their ends and having other ends rotatably secured respectively to the box and platen adjacent a side wall of the box, the first and second arms of each set of arms being of sufficient length and being positioned with respect to the arms of other sets as to fold compactly inwardly across the respective first and second arms of opposed sets of arms with the front and rear sets of arms adjacent one side wall passing between the front and rear sets of arms adjacent the opposed side wall when the platen is moved into its withdrawn position; each first arm extending generally downwardly from its pivotal connection to the box and thence generally inwardly at an oblique angle for folding connection to its associated second arm when the platen is in its withdrawn position; the pressing mechanism including a pair of cross members respectively joining front and rear arms at the vertices of the oblique angles, and a hydraulic cylinder and piston extending transversely between the cross members to force the latter apart and together for lowering and raising the platen.*

* * * * *